United States Patent
Kim et al.

(10) Patent No.: US 12,280,653 B2
(45) Date of Patent: *Apr. 22, 2025

(54) BATTERY UNIT FOR VEHICLE AND UNDERBODY OF VEHICLE INCLUDING THE SAME

(71) Applicants: Hyundai Motor Company, Seoul (KR); Kia Corporation, Seoul (KR)

(72) Inventors: Sang Wan Kim, Busan (KR); Kyung Ho Kim, Gyeonggi-do (KR); Hyeon Su Jin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,680

(22) Filed: Feb. 9, 2024

(65) Prior Publication Data
US 2024/0181862 A1 Jun. 6, 2024

Related U.S. Application Data

(63) Continuation of application No. 17/462,830, filed on Aug. 31, 2021, now Pat. No. 11,932,097, which is a
(Continued)

(30) Foreign Application Priority Data

Oct. 4, 2019 (KR) ........................ 10-2019-0123264
Nov. 27, 2020 (KR) ........................ 10-2020-0162439

(51) Int. Cl.
*B60K 1/04* (2019.01)
*H01M 50/298* (2021.01)
*H01M 50/502* (2021.01)

(52) U.S. Cl.
CPC ............. *B60K 1/04* (2013.01); *H01M 50/298* (2021.01); *H01M 50/502* (2021.01); *B60K 2001/0438* (2013.01)

(58) Field of Classification Search
CPC ............. B60K 1/04; B60K 2001/0438; H01M 50/298; H01M 50/502
See application file for complete search history.

(56) References Cited

U.S. PATENT DOCUMENTS

| 4,365,681 A | 12/1982 | Singh |
| 5,385,793 A | 1/1995 | Tiedemann et al. |

(Continued)

FOREIGN PATENT DOCUMENTS

| DE | 10-2015-000578 A1 | 7/2016 |
| EP | 2199133 A2 | 6/2010 |

(Continued)

OTHER PUBLICATIONS

Non-Final Office Action issued on Apr. 12, 2023 in U.S. Appl. No. 17/522,213.
(Continued)

*Primary Examiner* — Jason D Shanske
*Assistant Examiner* — James J Triggs
(74) *Attorney, Agent, or Firm* — Fox Rothschild LLP

(57) ABSTRACT

A battery unit for a vehicle is provided. The battery unit includes a lower case having two battery compartments arranged in a direction toward opposite sides of the vehicle, respectively, and a connecting portion bent to be convex upwardly between the two battery compartments. A reinforcing structure is disposed on the connecting portion. Two battery modules are installed in the two battery compartments, respectively and a power wire is electrically connected to at least one of the two battery modules and extends from one of the two battery compartments to the other one
(Continued)

of the two battery compartments through the connecting portion.

6 Claims, 14 Drawing Sheets

Related U.S. Application Data continuation-in-part of application No. 16/827,604, filed on Mar. 23, 2020, now Pat. No. 11,235,670.

(56) References Cited

U.S. PATENT DOCUMENTS

| | | | |
|---|---|---|---|
| 5,390,754 A | 2/1995 | Masuyama et al. | |
| 5,456,994 A | 10/1995 | Mita | |
| 5,585,204 A | 12/1996 | Oshida et al. | |
| 6,632,560 B1 | 10/2003 | Zhou et al. | |
| 7,638,233 B2 | 12/2009 | Vettoretti et al. | |
| 8,967,312 B2 | 3/2015 | Yanagi | |
| 9,444,124 B2 | 9/2016 | Beltz et al. | |
| 9,499,205 B1 * | 11/2016 | Elia | B60K 6/28 |
| 9,925,890 B2 * | 3/2018 | Enning | B60L 50/64 |
| 11,165,109 B2 | 11/2021 | Ohkuma | |
| 11,932,097 B2 * | 3/2024 | Kim | B60K 1/04 |
| 2004/0033415 A1 | 2/2004 | Chen et al. | |
| 2009/0139781 A1 | 6/2009 | Straubel | |
| 2010/0244557 A1 | 9/2010 | Ito et al. | |
| 2011/0318626 A1 | 12/2011 | Bartenschlager | |
| 2012/0301765 A1 | 11/2012 | Loo et al. | |
| 2012/0312612 A1 | 12/2012 | Harrison, III et al. | |
| 2012/0312614 A1 | 12/2012 | Fujiwara et al. | |
| 2012/0321927 A1 | 12/2012 | Loo et al. | |
| 2013/0248264 A1 | 9/2013 | Matsuda et al. | |
| 2014/0060944 A1 | 3/2014 | Fillion et al. | |
| 2014/0370367 A1 | 12/2014 | Higuchi et al. | |
| 2015/0107921 A1 | 4/2015 | Naruke | |
| 2015/0295287 A1 | 10/2015 | Schnaars et al. | |
| 2016/0294025 A1 | 10/2016 | Choi et al. | |
| 2018/0326933 A1 | 11/2018 | Pahisson et al. | |
| 2020/0108690 A1 | 4/2020 | Tan et al. | |
| 2020/0161728 A1 | 5/2020 | Wang | |
| 2022/0158267 A1 | 5/2022 | Kim | |
| 2022/0348094 A1 | 11/2022 | Pan et al. | |

FOREIGN PATENT DOCUMENTS

| | | |
|---|---|---|
| JP | 2013-193706 A | 9/2013 |
| KR | 10-2011-0051694 A | 5/2011 |
| KR | 10-2012-0114638 A | 10/2012 |

OTHER PUBLICATIONS

Notice of Allowance issued on Aug. 17, 2023 in U.S. Appl. No. 17/522,712.

Office Action issued Apr. 22, 2024 in corresponding Korean Patent Application No. 10-2019-0123264.

Office Action issued Feb. 27, 2025 in Korean Patent Application No. 10-2020-0164466.

* cited by examiner

BATTERY UNIT FOR VEHICLE AND UNDERBODY OF VEHICLE INCLUDING THE SAME

CROSS REFERENCE TO RELATED APPLICATION

The present application is a Continuation of U.S. patent application Ser. No. 17/462,830, filed on Aug. 31, 2021, which is a Continuation-in-part of U.S. patent application Ser. No. 16/827,604, filed on Oct. 4, 2019, which claims priority to Korean Patent Application No. 10-2019-0123264, filed on Oct. 4, 2019 and Korean Patent Application No. 10-2020-0162439, filed Nov. 27, 2020, the entire contents of which is incorporated herein for all purposes by this reference.

BACKGROUND

1. Technical Field

The present disclosure relates to a battery unit for a vehicle and an underbody of the vehicle including the same, and more particularly, to a battery unit having a structure to be installed under a center floor of a vehicle and an underbody of the vehicle on which the battery unit is installed.

2. Description of the Related Art

An electrically driven vehicle that is driven using an electric motor, such as a hybrid vehicle, a fuel cell vehicle, or an electric vehicle, includes a high voltage battery unit that stores driving power to be provided to the electric motor. The high voltage battery unit generally includes a case that forms a sealed internal space for a battery and a plurality of battery cells, and may also include a battery management system (BMS) configured to monitor voltages, currents, temperatures, and the like of battery modules installed in the sealed internal space of the case and battery cells in the battery modules, and manage the battery based thereon.

In addition, as a way of installing a high voltage battery module in the electrically driven vehicle, the high voltage battery unit is mounted in a trunk or a luggage space of the vehicle or mounted and fixed under a center floor of a vehicle body outside the vehicle. When the high voltage battery unit is mounted in the trunk or the luggage space of the vehicle, since the trunk or the luggage space of the vehicle is reduced, it is difficult to mount other components required for the vehicle such as spare tires, and it is also difficult to mount a third-row seat or implement a full flat seat utilizing the luggage space in a sport utility vehicle (SUV) or a multi-purpose vehicle (MPV).

When the high voltage battery unit is mounted under the center floor of the vehicle, it is possible to maximize the utilization of the trunk or the luggage space in the vehicle, but it is difficult to secure a space for disposing a propeller shaft for transmitting power from a power train (an engine and a motor), which is mounted at the front of the vehicle, to a rear wheel. Thus, when the high voltage battery unit is installed under the center floor outside the vehicle, it is necessary to mount a separate motor for driving the rear wheel to implement an all-wheel drive (AWD) operation. Particularly, it is not possible to increase a size of the motor for driving the rear wheel due to the limited installation space, resulting in a disadvantage in terms of power performance.

The contents described as the related art have been provided only to assist in understanding the background of the present disclosure and should not be considered as corresponding to the related art known to those having ordinary skill in the art.

SUMMARY

An object of the present disclosure is to provide a battery unit for a vehicle having a structure capable of transmitting power from a power train, which is provided at the front of the vehicle, to a rear wheel, while being installed under a center floor outside the vehicle, and an underbody of the vehicle including the same.

According to an exemplary embodiment of the present disclosure, a battery unit for a vehicle may include: a lower case having two battery compartments arranged in a direction toward opposite sides of the vehicle, respectively, and a connecting portion bent to be convex upwardly between the two battery compartments; a reinforcing structure disposed on the connecting portion; two battery modules installed in the two battery compartments, respectively; and a power wire electrically connected to at least one of the two battery modules and extending from one of the two battery compartments to the other one of the two battery compartments through the connecting portion.

The reinforcing structure may include a lower plate fixed to the lower case, an upper plate spaced apart from the lower plate at a predetermined distance, and supports each connected to the lower plate and the upper plate. A first aperture allowing a fixing component for fixing the reinforcing structure to the lower case to penetrate there through may be formed in the lower plate, and a second aperture may be formed in the upper plate at an area corresponding to the first aperture. A plurality of reinforcing structures may be installed, and the power wire may be disposed between the plurality of reinforcing structures.

The battery unit may further include a connection patch disposed between the lower case and the reinforcing structure to bond the connection patch to the lower case and to fix the reinforcing structure to the connection patch. The connection patch may include a plurality of studs protruding in a direction opposite to the lower case, and the reinforcing structure may be fixed to at least some of the plurality of studs. The power wire may be fixed to some of the plurality of studs.

According to another exemplary embodiment of the present disclosure, an underbody of a vehicle may include: a center floor of the vehicle; and a battery unit having: a lower case disposed under the center floor, having two battery compartments arranged in a direction toward opposite sides of the vehicle, respectively, and a connecting portion bent to be convex upwardly between the two battery compartments to connect the two battery compartments to each other, and forming an installation space under the connecting portion between the two battery compartments; a reinforcing structure disposed on the connecting portion; two battery modules installed in the two battery compartments, respectively; and a power wire electrically connected to at least one of the two battery modules and extending from one of the two battery compartments to the other one of the two battery compartments through the connecting portion, wherein a propeller shaft of the vehicle is disposed in the installation space.

The center floor may have a center tunnel indented upwardly along a front-rear direction, and the connecting portion may be inserted into the center tunnel to be disposed thereon. The reinforcing structure may include a lower plate fixed to the lower case, an upper plate spaced apart from the lower plate at a predetermined distance, and supports each connected to the lower plate and the upper plate. A first aperture allowing a fixing component that fixes the reinforcing structure to the lower case to penetrate therethrough may be formed in the lower plate, and a second aperture may be formed in the upper plate at an area corresponding to the first aperture.

A plurality of reinforcing structures may be installed, and the power wire may be disposed between the plurality of reinforcing structures. The battery unit may further include a connection patch disposed between the lower case and the reinforcing structure to bond the connection patch to the lower case and to fix the reinforcing structure to the connection patch. The connection patch may include a plurality of studs protruding in a direction opposite to the lower case, and the reinforcing structure may be fixed to at least some of the plurality of studs. The power wire may be fixed to some of the plurality of studs.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
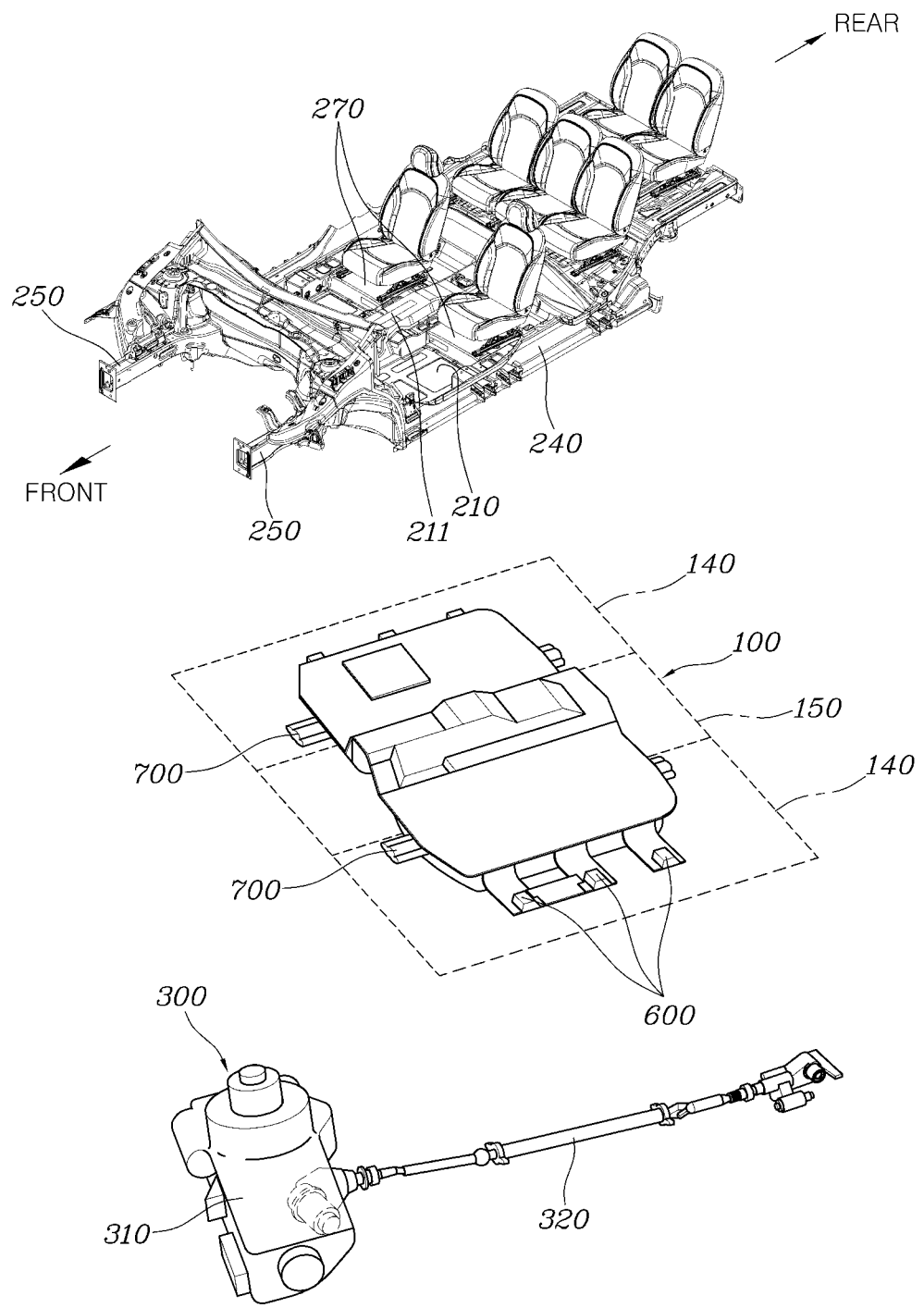
FIG. 1 is an exploded perspective view illustrating a battery unit according to an exemplary embodiment of the present disclosure and peripheral vehicle components thereof.
Figure 2:
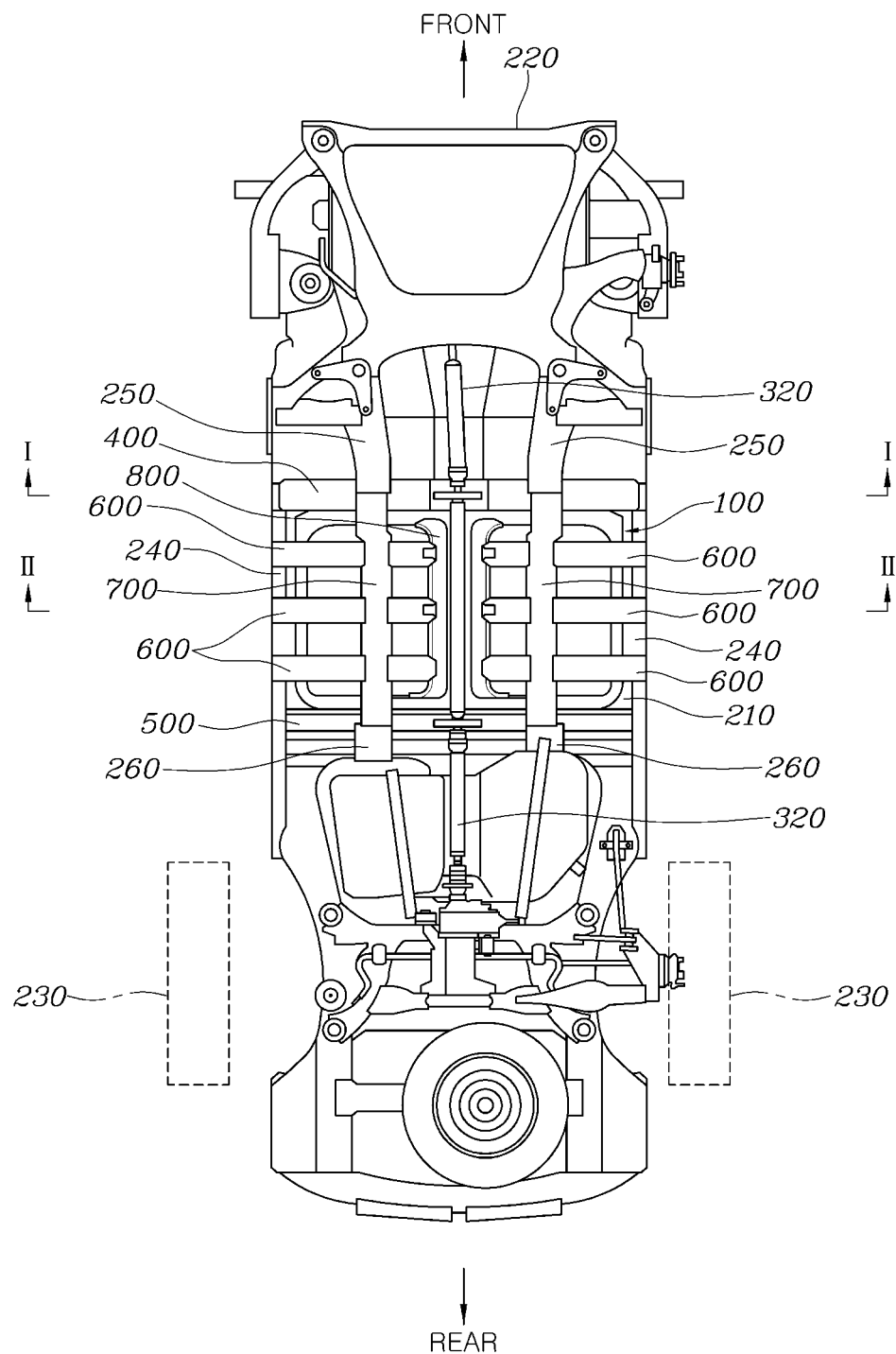
FIG. 2 is a bottom view of the components illustrated in FIG. 1 in an assembled state.
Figure 3:
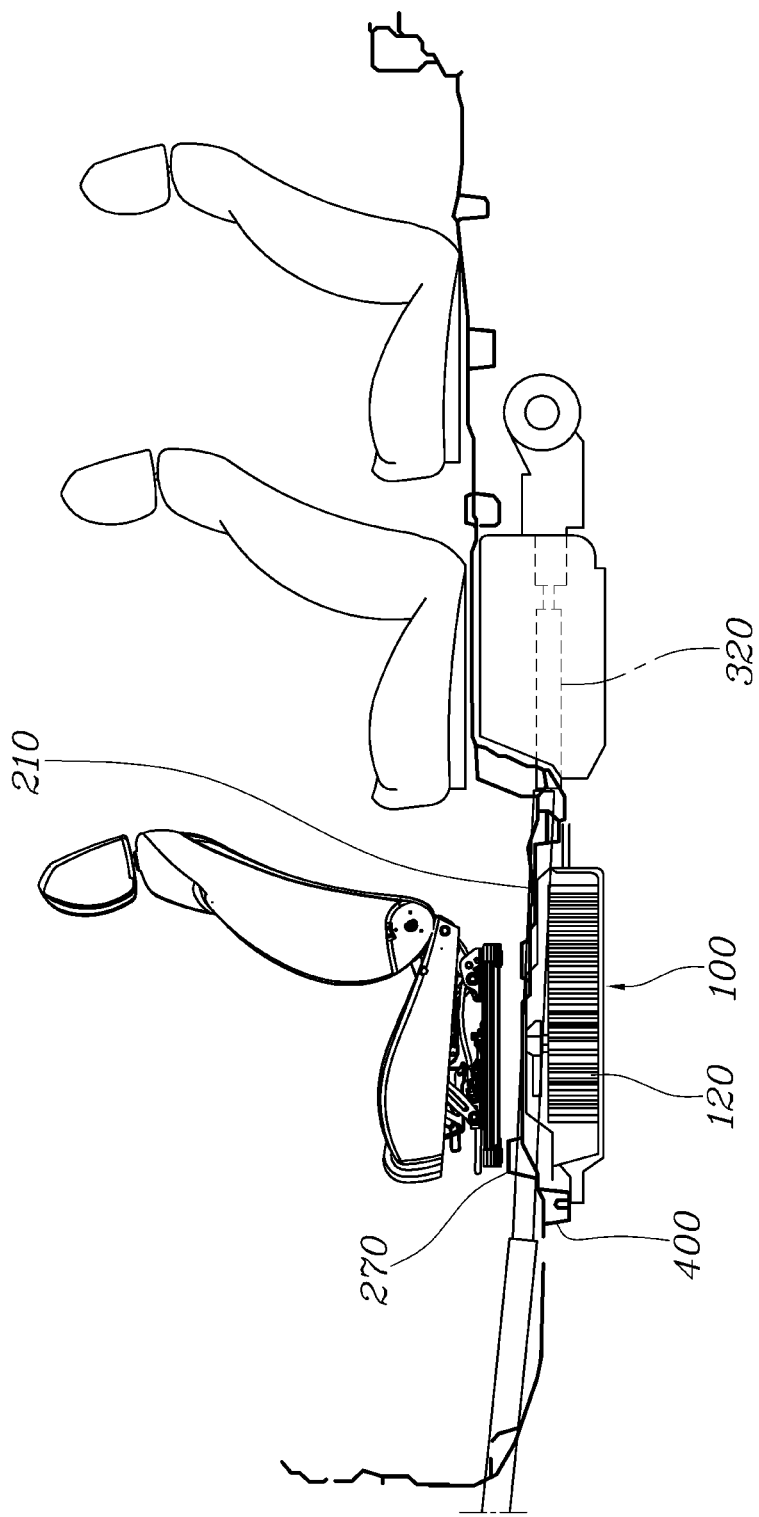
FIG. 3 is a side view of the components illustrated in FIG. 1 in an assembled state.
Figure 4:
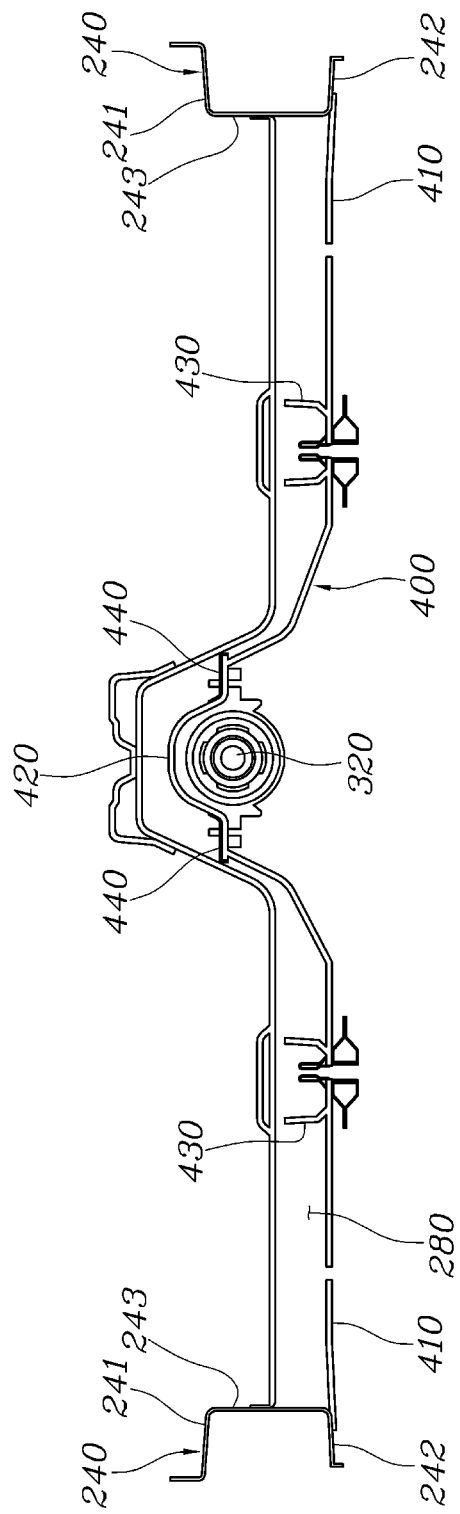
FIGS. 4 and 5 are cross-sectional views taken along lines I-I and II-II of FIG. 2, respectively.
Figure 5:
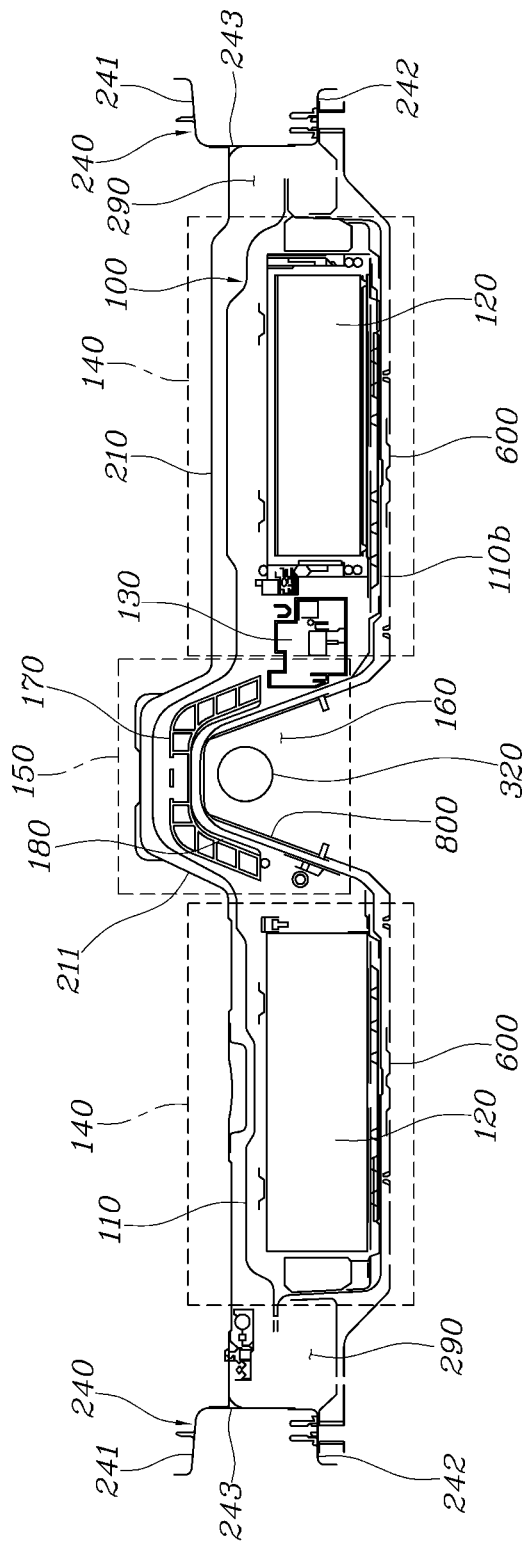
Figure 6:
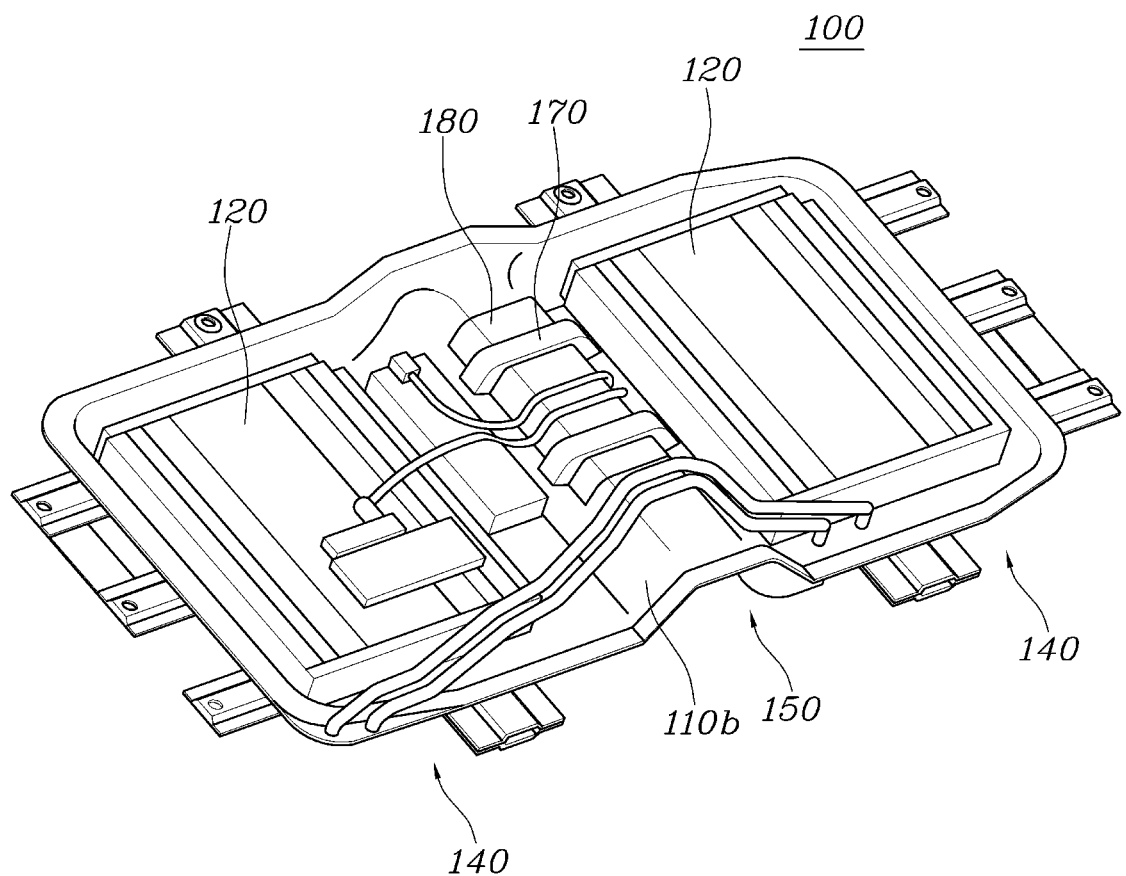
FIG. 6 is a plan view illustrating the battery unit according to an exemplary embodiment of the present disclosure in a state where an upper case is removed therefrom.
Figure 7:
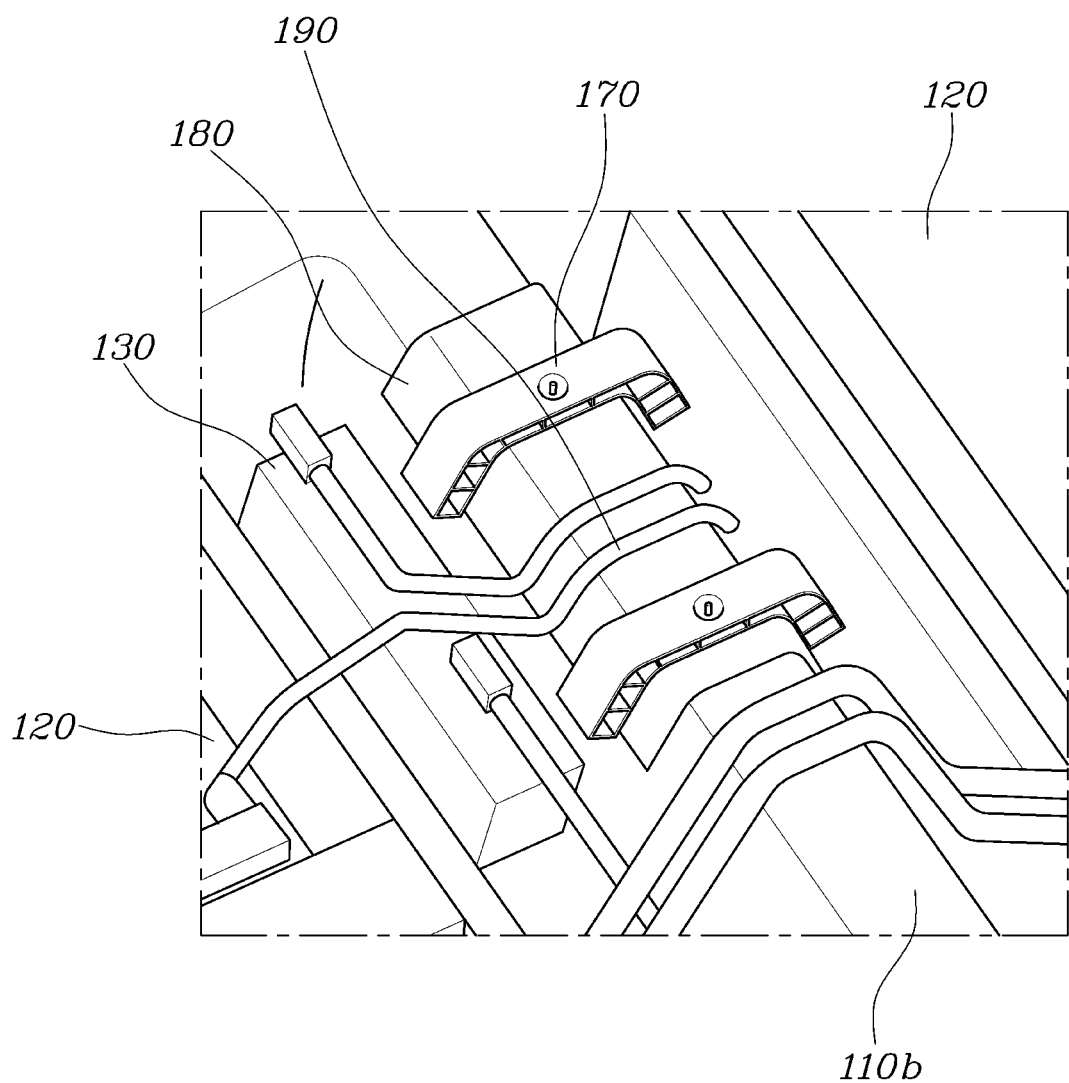
FIG. 7 is a perspective view illustrating a connecting portion of the battery unit according to an exemplary embodiment of the present disclosure in more detail.
Figure 8:
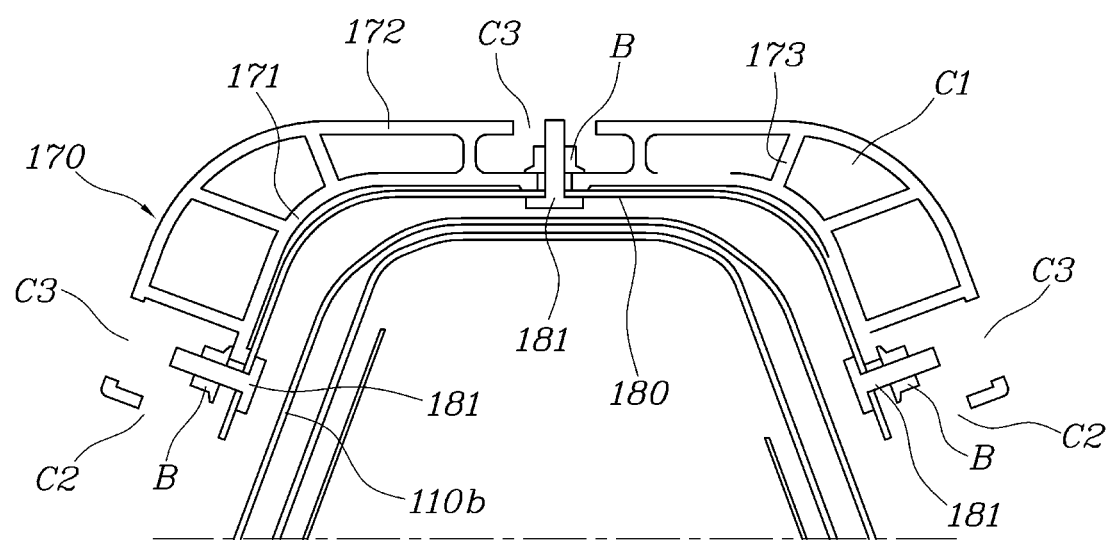
FIG. 8 is a cross-sectional view illustrating an installation position of a reinforcing structure on the connecting portion of the battery unit according to an exemplary embodiment of the present disclosure in more detail.
Figure 9:
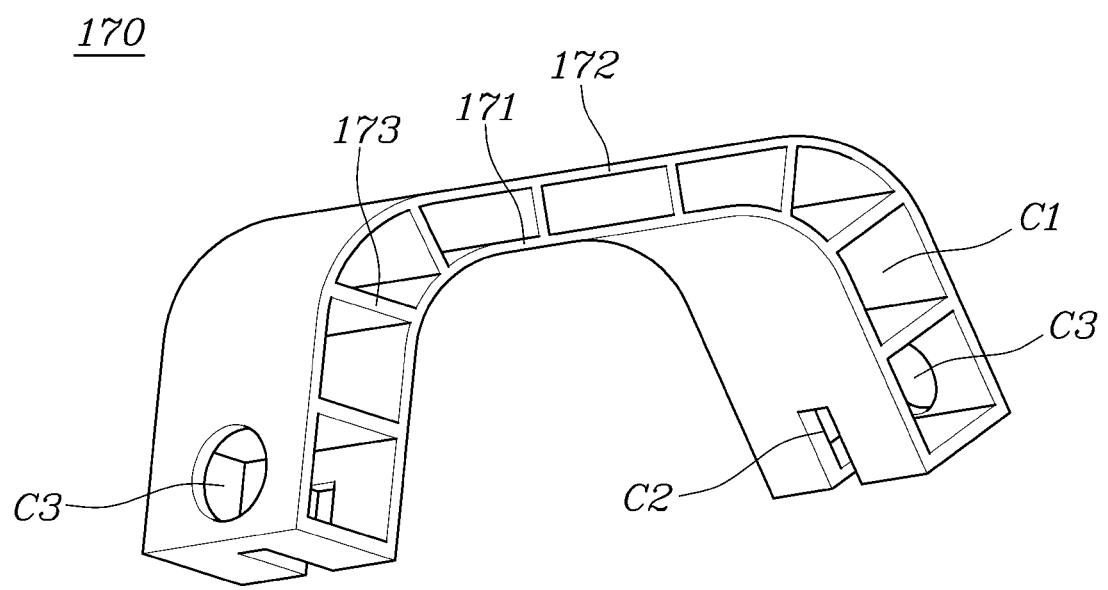
FIG. 9 is a perspective view illustrating the reinforcing structure included in the battery unit according to an exemplary embodiment of the present disclosure.
Figure 10:
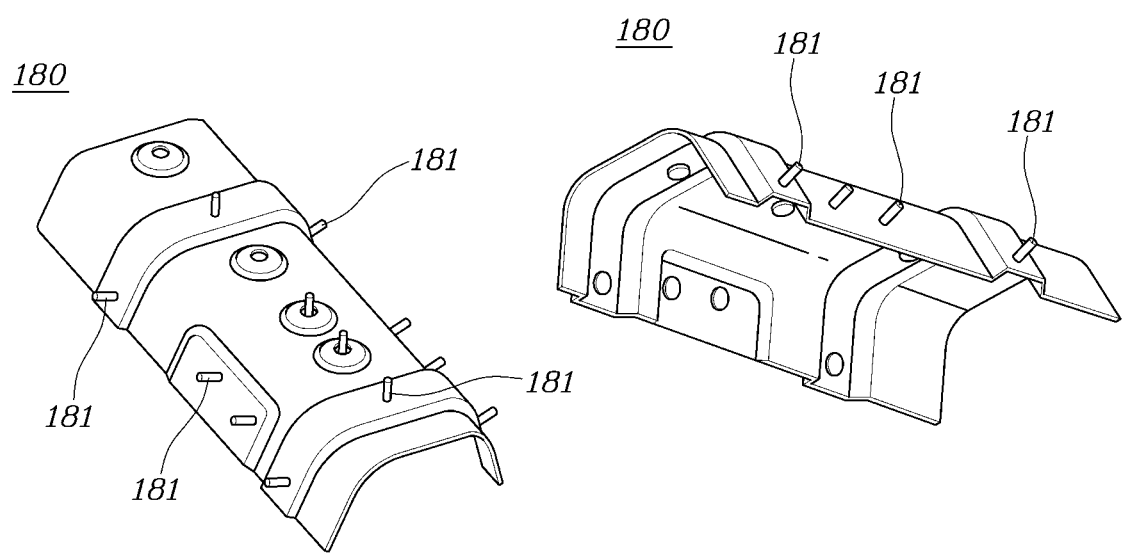
FIG. 10 is a top perspective view and a bottom perspective view illustrating a connection patch included in the battery unit according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a battery unit for a vehicle according to various exemplary embodiments of the present disclosure and an underbody of the vehicle including the same will be described in detail with reference to the accompanying drawings. First of all, a battery unit according to an exemplary embodiment of the present disclosure and an installation structure of the battery unit will be described with reference to FIGS. 1 to 10.

Referring to FIGS. 1 to 10, the battery unit according to an exemplary embodiment of the present disclosure may be fixedly disposed under a center floor 210 of the vehicle, and configured to allow a propeller shaft 320 of a driving device 300 of the vehicle to pass through the battery unit 100 in a front-rear direction of the vehicle to transmit power to a rear wheel 230.

The battery unit 100 according to an exemplary embodiment of the present disclosure may include a battery case having an upper case 110*a* and a lower case 110*b* forming a sealed internal space, battery modules 120 fixedly installed in the sealed internal space of the battery case, and a battery management system (BMS) 130 configured to monitor and manage voltages, currents, temperatures, and the like of the battery modules 120 or battery cells in the battery modules 120.

The lower case 110*b* of the battery unit 100 according to an exemplary embodiment of the present disclosure may be divided into two battery compartments 140 disposed in a direction toward opposite sides of the vehicle, respectively, such that the battery modules 120 are accommodated therein, and a connecting portion 150 bent to be convex upwardly between the battery compartments 140 to connect the two battery compartments 140 to each other. The upper case 110a may cover an upper side of the lower case 110b, thereby forming a sealed internal space. The upper case 110a may be formed to have a shape that corresponds to an upper end shape of the lower case 110b. The battery module 120 may include a plurality of battery cells electrically connected to each other. A voltage of the battery module 120 may be determined based on whether the plurality of battery cells included therein are connected to each other in series or in parallel.

In various exemplary embodiments of the present disclosure, the two battery modules 120 may be arranged in the two battery compartments 140 spatially separated from each other by the connecting portion 150, respectively, and the BMS 130 may be installed in one of the two battery compartments 140. Accordingly, high voltage power wires 190 connected to one of the battery modules 120 installed in one of the battery compartments 140 need to extend to the other one of the battery compartments 140. In particular, the wires may be arranged along the connecting portion 150 connecting the two battery compartments 140 to each other.

Meanwhile, the battery unit 100 may be fixedly installed under the center floor 210 of the vehicle outside the vehicle, and the center floor 210 may have a center tunnel 211 that protrudes upwardly, bent, and that extends in the front-rear direction of the vehicle. The battery unit 100 may be installed such that the above-described battery compartments 140 of the battery unit 100 are positioned on the left and right sides of the center tunnel 211, respectively. In addition, the connecting portion 150 may be bent to protrude upwardly, like the center tunnel 211 of the center floor 210, to install the battery unit 100 under the center floor 210 of the vehicle in a state where the connecting portion 150 is inserted into the center tunnel 211.

In other words, the connecting portion 150, which is a portion protruding upwardly while connecting upper sides of the battery compartments 140 positioned on both sides of the vehicle with respect to the center tunnel 211, may be indented along the center tunnel 211. In addition, an installation space 160 that is open in the front-rear direction of the vehicle may be formed under the connecting portion 150 between the two battery compartments 140.

In an exemplary embodiment of the present disclosure, the propeller shaft 320 of the driving device 300 of the vehicle may be disposed in the installation space 160. In other words, in the battery unit 100 according to an exemplary embodiment of the present disclosure, since the installation space 160 is formed under the case, even when the battery unit 100 is installed under the center floor 210 of the vehicle, it may be possible to secure a space for disposing the propeller shaft 320 transmitting power from a power train 310, which is positioned at the front of the vehicle, to the rear wheel.

Meanwhile, the battery unit 100 according to an exemplary embodiment of the present disclosure may further include a reinforcing structure 170 for protecting the wires in the event of an impact. In addition, the battery unit 100 according to an exemplary embodiment of the present disclosure may further include a connection patch 180 for fixing the reinforcing structure 170 to the case of the battery unit 100.

When the battery unit 100 is installed under the center floor 210 of the vehicle, if a collision occurs on a side surface of the vehicle, a seat cross member 270 of a vehicle body installed on the battery unit 100 may be pushed downwardly into the battery unit 100, and an upper portion of the battery unit 100 may be damaged. As described above, the lower case 110b of the battery unit 100 according to an exemplary embodiment of the present disclosure has the connecting portion 150 that is convex upwardly, and the high voltage power wires 190 forming the electrical connection with the battery modules 120 are disposed on the connecting portion 150. Accordingly, in the event of the collision on the side surface of the vehicle, the high voltage power wires 190 may be damaged by the intrusion of the seat cross member 270 thereinto, thereby causing a dangerous situation in which the high voltage wires are exposed to the outside.

To prevent such a dangerous situation that may occur when vehicle collides, in the present disclosure, the reinforcing structure 170 made of a material having a rigidity that is high enough to secure a predetermined height may be fixedly disposed in an area corresponding to the connecting portion 150. The reinforcing structure 170 may have a shape that corresponds to the curved surface of the connection portion of the lower case 110b, and may include a lower plate 171 fixed to the lower case 110b in the area that corresponds to the connecting portion 150, an upper plate 172 spaced apart from the lower plate 171 at a predetermined distance, and supports 173 each connected to the lower plate 171 and the upper plate 172.

The lower plate 171, the upper plate 172, and the supports 173 may be manufactured in an integral type, and the reinforcing structure 170 may include a plurality of supports 173 to implement a hollow structure with a plurality of hollows C1 between the lower plate 171 and the upper plate 172. The lower plate 171 may have apertures C2 allowing a coupling means attached to the lower case 110b, such as studs, to penetrate therethrough, and the upper plate 172 may have apertures C3 allowing a tool or the like for coupling the reinforcing structure 170 to the coupling means to penetrate therethrough at areas corresponding to the apertures C2.

A plurality of reinforcing structures 170 may be installed on the connecting portion 150 of the lower case 110b, and the high-voltage power wires 190 may be arranged between the plurality of reinforcing structures 170, thereby preventing the power wires 190 from being damaged by the intrusion of an external structure (e.g., the seat cross member of the vehicle body) thereinto in the event of an impact. In this way, in an exemplary embodiment of the present disclosure, the power wires 190 in the battery unit 100 may be prevented from being damaged when an accident occurs, thereby preventing a secondary accident such as an electric shock caused by the exposure to the high voltage.

To fixedly install the above-described reinforcing structure 170 on the lower case 110b, the battery unit 100 according to an exemplary embodiment of the present disclosure may further include a connection patch 180. The connection patch 180 may be disposed between the lower case 110b and the reinforcing structure 170, and the connection patch 180 may be fixedly installed on the lower case 110b by bonding at least a portion of a surface thereof contacting the lower case 110b to the lower case 110b through welding or the like. The connection patch 180 may include a plurality of studs 181 that protrude from an exposed surface thereof in a direction opposite to the lower case 110b to fix the reinforcing structure 170 thereto.

At least some of the studs 181 may be arranged to correspond to the position where the reinforcing structure 170 is installed, and the reinforcing structure 170 may be coupled to the studs 181 using bolts B. In other words, the reinforcing structure 170 may be fixed onto the connection patch 180 by disposing the reinforcing structure 170 such that some of the studs 181 are arranged in the apertures C2 formed in the lower plate 171 of the reinforcing structure 170 and then bringing the tool through the apertures C3 formed in the upper plate 172 of the reinforcing structure 170 to fasten the bolts B to the studs 181.

The rest of the studs 181 may be used to fix the power wires 190 that extend from one of the battery compartments 140 (e.g., a first battery component) to the other one of the battery compartments 140 (e.g., a second battery component) of the lower case 110b. In other words, at least some of the studs 181 positioned between the two fixed reinforcing structures 170 may be used to fix the power wires 190. For example, the power wires 190 may be fixed to the studs 181 using wire fixing pins or the like, to stably position the power wires 190 between the two reinforcing structures 170.

Figure 11:
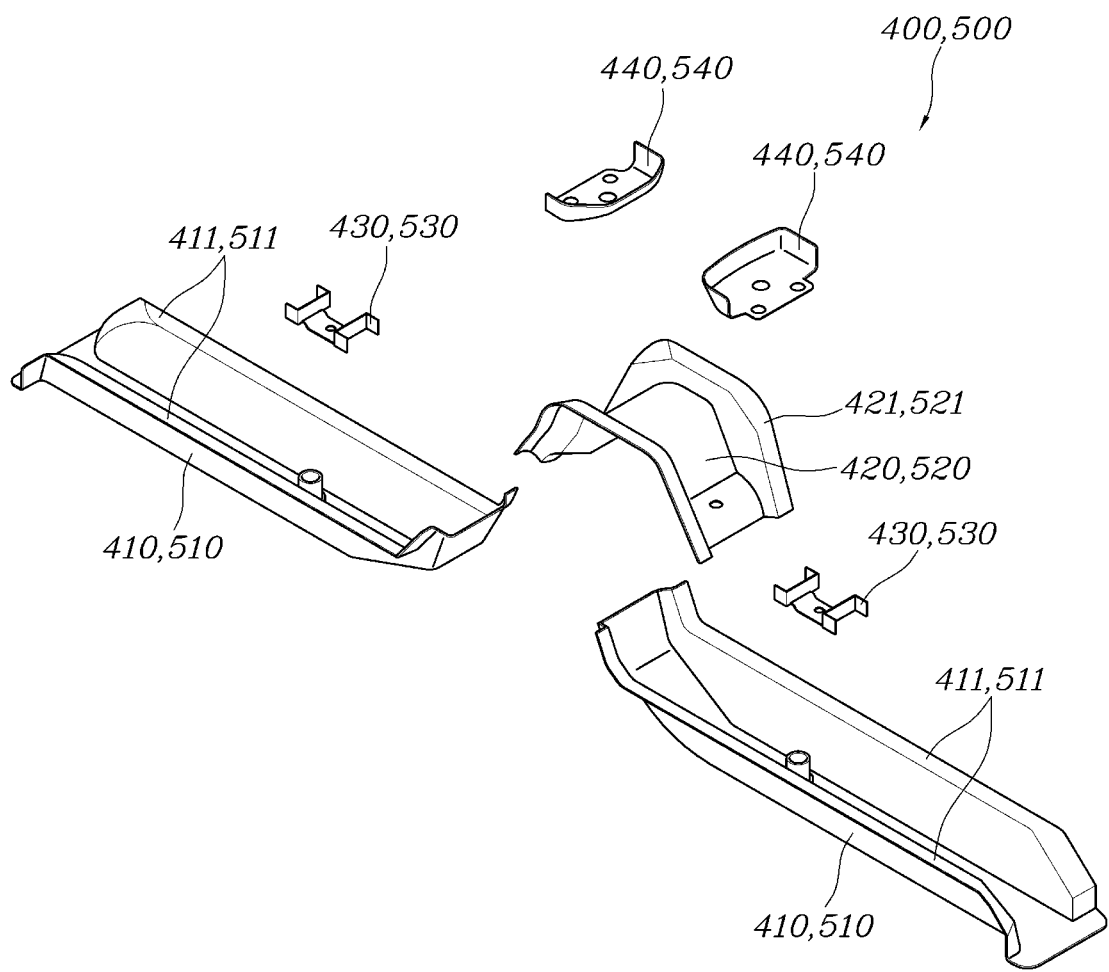
FIG. 11 is an exploded perspective view of a front cross member and a rear cross member provided in an underbody of the vehicle according to an exemplary embodiment of the present disclosure.
Figure 12:
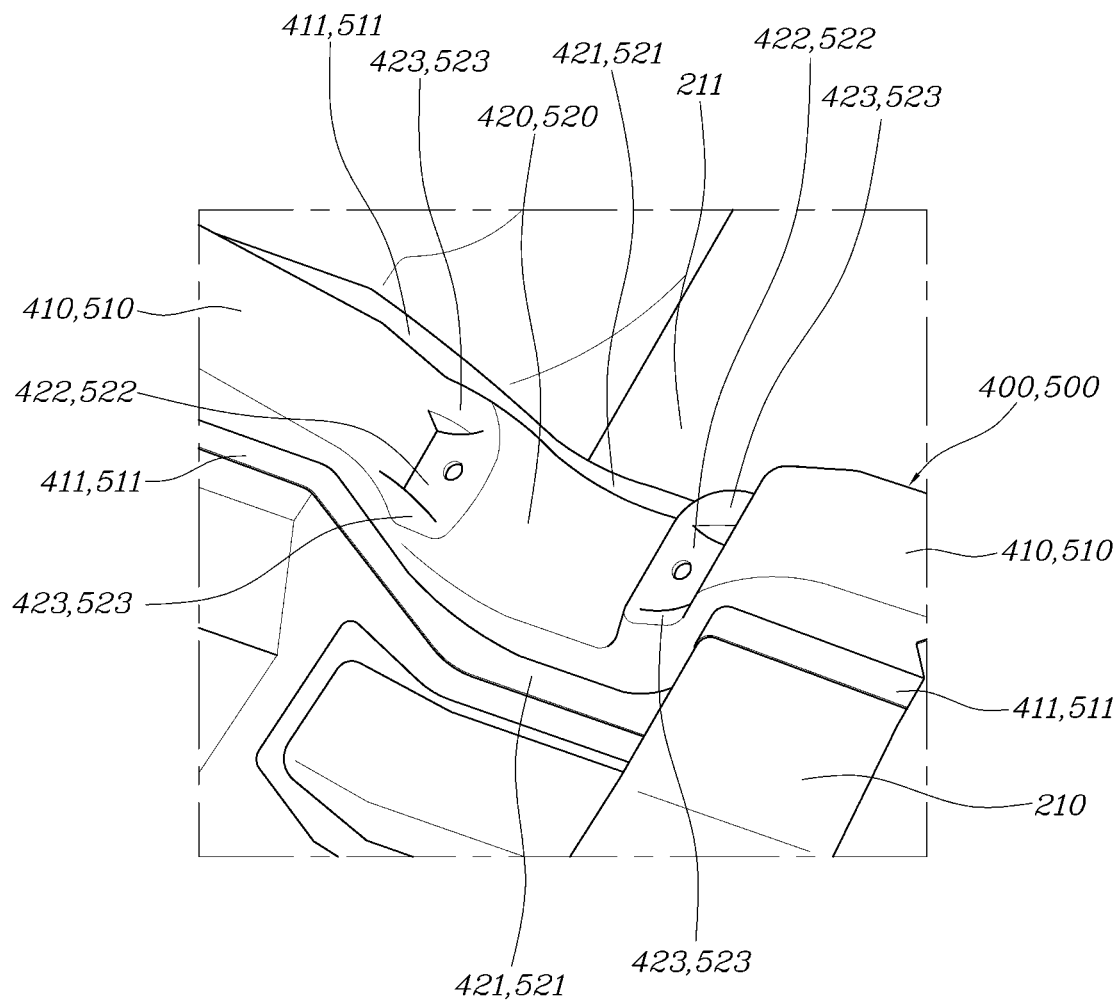
FIG. 12 is a bottom perspective view illustrating a state where the front cross member and the rear cross member are coupled to a center floor in the underbody of the vehicle according to an exemplary embodiment of the present disclosure.
Figure 13:
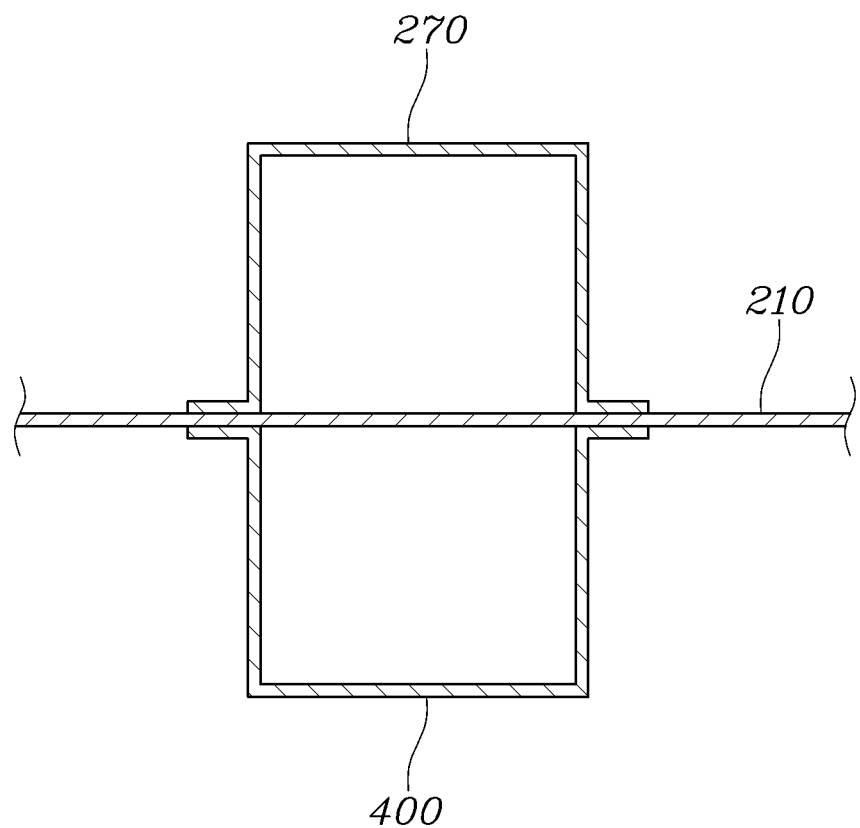
FIGS. 13 and 14 are views for explaining examples of a coupled structure of the front cross member and a seat cross member in the underbody of the vehicle according to an exemplary embodiment of the present disclosure.
Figure 14:
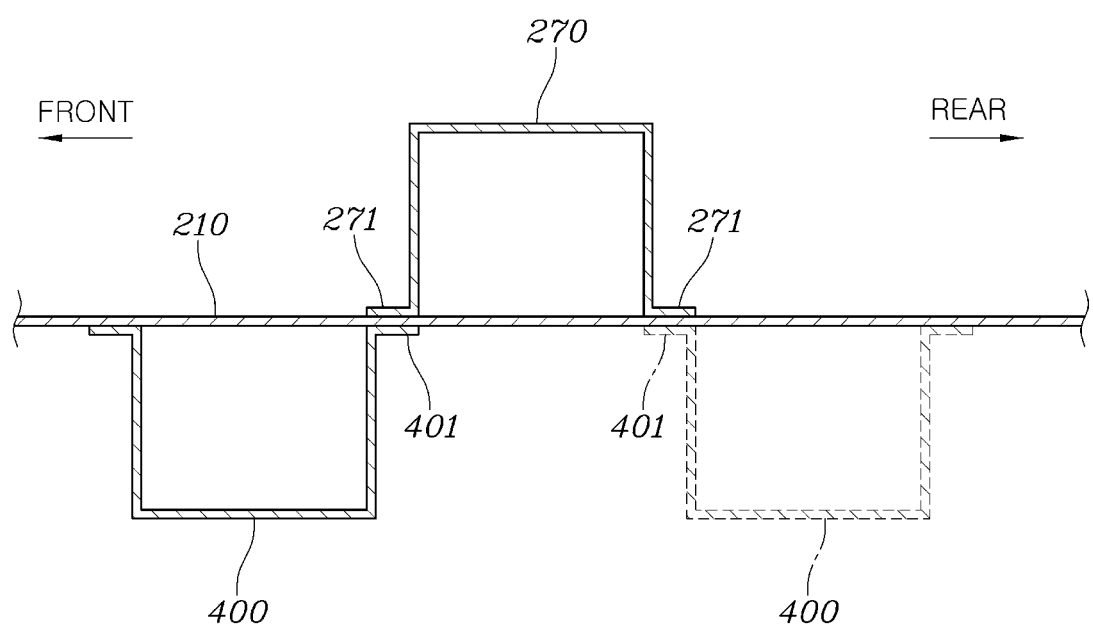

Next, an underbody of the vehicle according to an exemplary embodiment of the present disclosure will be described with reference to all the remaining drawings. FIG. 11 is an exploded perspective view of a front cross member and a rear cross member provided in an underbody of the vehicle according to an exemplary embodiment of the present disclosure, FIG. 12 is a bottom perspective view illustrating a state where the front cross member and the rear cross member are coupled to the center floor in the underbody of the vehicle according to an exemplary embodiment of the present disclosure, and FIGS. 13 and 14 are views for explaining examples of a coupled structure of the front cross member and the seat cross member in the underbody of the vehicle according to an exemplary embodiment of the present disclosure.

The driving device 300 of the vehicle may include a power train 310 including an engine and a motor, and a propeller shaft 320 that transmits power from the power train 310. The power train 310 may be fixedly installed on a sub-frame 220 positioned at the front of the vehicle, and the propeller shaft 320 may be disposed to extend in the front-rear direction of the vehicle, with one end thereof being connected to the power train 310. As described above, the propeller shaft 320 may be disposed in the installation space 160 under the connecting portion 150 of the battery unit 100. Although not illustrated, an exhaust pipe that extends from the power train 310 to the rear of the vehicle may also be disposed in the installation space 160.

As already known in the related art, the propeller shaft 320 of the vehicle is a component that transmits power from the power train 310 to the rear wheel 230. Since the power generated from the power train 310 is transmitted to the rear wheel 230 through the propeller shaft 320, the rear wheel 203 may be driven by the power of the power train 310 mounted at the front of the vehicle.

Since the battery unit 100 is installed under the center floor 210, a front cross member 400 and a rear cross member 500 are fixedly installed under the center floor 210 at the front and the rear of the battery unit 100, respectively. Both the front cross member 400 and the rear cross member 500 may be structures extending in a direction toward the opposite sides of the vehicle, with both ends being connected to side sills 240 positioned on the left and right sides of the vehicle, respectively, thereby forming load paths toward the side sills 240.

In addition, the front cross member 400 may be connected to rear ends of front side members 250 to form load paths for transmitting a load to the front side members 250, and the rear cross member 500 may be connected to front ends of rear side members 260 to form load paths for transmitting a load to the rear side members 260. Since both the front cross member 400 and the rear cross member 500 are connected to vehicle body structures (e.g., the center floor, the side sills, the front side members, and rear side members), it is possible to increase a rigidity of a vehicle body, thereby improving ride and handling (R&H) performance and noise, vibration, and harshness (NVH) performance of the vehicle.

Since the battery unit 100, which is positioned under the center floor 210 outside the vehicle, is installed such that an outer perimeter thereof is surrounded by the side sills 240 positioned on the opposite sides and the front cross member 400 and the rear cross member 500 positioned on the front and rear sides, the installation position of the battery unit 100 may be regulated by the side sills 240 positioned on the opposite sides and the front cross member 400 and the rear cross member 500 positioned on the front and rear sides, and furthermore, the battery unit 100 may be sufficiently protected against impacts from the front, rear, and lateral sides of the vehicle.

The propeller shaft 320 of the driving device 300, which is disposed to pass through the installation space 160 under the connecting portion 150, may be mounted on at least one of the front cross member 400, the rear cross member 500, and the battery unit 100 to have a strong coupling force. The seat cross member 270 may be coupled on the center floor 210 while being disposed in the left-right direction, and the front cross member 400 may be disposed to vertically overlap the seat cross member 270 with the center floor 210 interposed there between. The vertical overlapping structure of the seat cross member 270 and the front cross member 400 makes it possible to secure further improved durability, thereby further enhancing the stiffness and the rigidity of the vehicle body.

As another example, the front cross member 400 may be connected to the seat cross member 270 through flanges 271 and 401, with the center floor 210 interposed there between, while being disposed in front of or behind the seat cross member 270. Each of the front cross member 400 and the rear cross member 500 includes two side parts 410 or 510 and a connection part 420 or 520 connecting the two side parts 410 or 510. The side part 410 or 510 may be formed in an approximately straight shape with a U-shaped cross section, and the connection part 420 or 520 may be formed in a tunnel shape to be convex upwardly with a U-shaped cross section like the side part 410 or 510.

The connection part 420 or 520 may be installed to be inserted into the center tunnel 211 of the center floor 210. All outward ends of the side parts 410 and 510 are connected to the side sills 240 of the vehicle to form load paths in a direction toward the opposite sides, and inward ends of the side parts 410 and 510 are coupled to opposite ends of the connection parts 420 and 520 to overlap each other, thereby maintaining a strong coupling force. All of the side parts 410 and 510 and the connection parts 420 and 520 may be open upwardly due to the U-shaped cross section, and flanges 411, 421, 511, and 521 of the upwardly open portions may be coupled to a lower surface of the center floor 210 in surface contact. Accordingly, the center floor 210, the side sills 240, the side parts 410 and 510, and the connection parts 420 and 520 form sealed closed spaces 280 therebetween. The sealed closed spaces 280 make it possible to further enhance the stiffness and the rigidity of the vehicle body.

The connection part 420 or 520 has coupling surfaces 422 or 522 formed at both ends thereof for the propeller shaft 320 to be coupled thereto, and beads 423 or 523 are formed on both sides of the coupling surfaces 422 or 522 for the side parts 410 or 510 to be connected thereto. The coupling surfaces 422 or 522 may be preferably formed to be plane to enhance a coupling force between the connection part 420 or 520 and the propeller shaft 320, but are not limited thereto. The coupling surfaces 422 or 522 may be formed in the same shape as the mounting surface of the propeller shaft 320 to couple the connection part 420 or 520 and the propeller shaft 320 in surface contact. In addition, the beads 423 or 523 formed on the connection part 420 or 520 are formed to be connected up to the side parts 410 or 510. Through the beads 423 and 523, it may be possible to further enhance the rigidity of the coupled portions between the connection part 420 or 520 and the side parts 410 or 510.

A first reinforcing bracket 430 or 530 may be coupled to an inner surface of each of the side parts 410 or 510. The first reinforcing bracket 430 coupled to the side part 410 of the front cross member 400 may be coupled to a front end of a longitudinal member 700 to be described later, and the first reinforcing bracket 530 coupled to the side part 510 of the rear cross member 500 may be coupled to a rear end of the longitudinal member 700 to be described later. Since the first reinforcing brackets 430 and 530 are coupled to a portion where the front cross member 400 and the longitudinal member 700 are coupled to each other and a portion where the rear cross member 500 and the longitudinal member 700 are coupled to each other, respectively, it may be possible to further enhance the rigidity of the coupled portions.

A second reinforcing bracket 440 or 540 for reinforcing the rigidity of the coupled portion may be coupled to each of the coupling surfaces 422 or 522 of the connection part 420 or 520 to which the propeller shaft 320 is coupled. The battery unit 100, which is installed under the center floor 210 outside the vehicle, may be supported on the lower side thereof and connected to vehicle body structures by a plurality of transverse members 600 and a plurality of longitudinal members 700.

In other words, in the battery unit 100, the plurality of transverse members 600 extending in the left-right direction and spaced apart from each other in the front-rear direction are coupled to the lower surfaces of the battery compartments 140, and the longitudinal members 700 extending in the front-rear direction are coupled to the lower surfaces of the battery compartments 140 to position one longitudinal member 700 for each of the battery compartments 140. In addition, the battery unit 100 may further include a connecting portion reinforcing member 800 indented and coupled into the connecting portion 150 while extending in the front-rear direction along the installation space 160.

The transverse member 600 may be installed across the longitudinal member 700. In particular, a first end of the transverse member 600 may be connected to the side sill 240 of the vehicle and a second end of the transverse member 600 may be connected to the connecting portion reinforcing member 800 to form a load path in a direction toward the side of the vehicle. In addition, since the transverse member 600 is connected to the longitudinal member 700, it may also be possible to form a load path in the front-rear direction.

As another example, the transverse members 600 may be positioned on the left and right sides of the longitudinal member 700, respectively, such that first ends of the transverse members 600 are connected to the left and right sides of the longitudinal member 700, respectively, and the second ends of the transverse members 600, which are not connected to the longitudinal member 700, are connected to the side sill 240 and the connecting portion reinforcing member 800, respectively. In this structure, the transverse member 600 and the longitudinal member 700 do not vertically overlap each other, resulting in an advantage that it may be possible to reduce a vertical height as compared with when the members vertically overlap each other.

Each of the side sills 240 positioned on the left and right sides of the vehicle may include an upper surface 241, a lower surface 242, and a side surface 243 when viewed in its longitudinal section, and the left and right ends of the center floor 210 are connected to the side surfaces 243 of the side sills 240, respectively. Accordingly, an accommodation space 290 that is open downwardly may be formed under the center floor 210 by the lower surface of the center floor 210 and the side surface 243 of the side sill 240.

The battery compartment 140 of the battery unit 100 may be installed in the accommodation space 290, to accommodate an upper portion of the battery compartment 140 in the accommodation space 290, and a lower portion of the battery compartment 140 protrudes downwardly beyond the side sill 240. This installation structure of the battery compartment 140 makes it possible to not only lower the center floor 210 as close to the ground as possible, thereby securing a sufficient indoor space, but also dispose most of the upper portion of the battery compartment 140 in the accommodation space 290, thereby spacing the battery compartment 140 distant from a road surface at a sufficient distance.

The battery unit for the vehicle and the underbody of the vehicle including the same are advantageous in terms of marketability in that the battery unit is fixedly installed under the center floor outside the vehicle, thereby making it possible to maximally use a trunk or luggage space. Particularly, the battery unit for the vehicle and the underbody of the vehicle including the same are advantageous in terms of vehicle manufacturing cost, weight, and fuel efficiency in that, while the battery unit is installed under the center floor, the battery unit may secure a space for installing the propeller shaft constituting the driving device of the vehicle to transmit power to the rear wheel, thereby implementing a four-wheel drive without using a separate motor for driving the rear wheel.

Further, the battery unit for the vehicle and the underbody of the vehicle including the same are advantageous in that the battery unit installed under the center floor is connected to vehicle body structures, such as the side sills, the front side members, and the rear side members, through the transverse members, the longitudinal members, the front cross member, the rear cross member, and the like, thereby enhancing the rigidity of the vehicle body and improving ride and handling (R&H) performance and noise, vibration, and harshness (NVH) performance of the vehicle.

In addition, the battery unit for the vehicle and the underbody of the vehicle including the same are advantageous in that the reinforcing member is installed on the connecting portion in the battery unit, thereby preventing the power wires in the battery unit from being damaged even if another member intrudes on the battery unit when the vehicle collides, and accordingly, preventing a secondary accident such as an electric shock resulting from the exposure to the high voltage.

The effects obtainable from the present disclosure are not limited to the above-mentioned ones, and other effects that are not mentioned above may be clearly understood from the description above by those having ordinary knowledge in the field of technology to which the present disclosure pertains.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A battery unit for a vehicle, comprising:
a lower case having two battery compartments arranged in a direction toward opposite sides of the vehicle, respectively, and a connecting portion bent to be convex upwardly between the two battery compartments;
a reinforcing structure disposed on the connecting portion;
two battery modules installed in the two battery compartments, respectively; and
a longitudinal member extending in a front-rear direction coupled to a lower surface of the two battery compartments,
wherein the reinforcing structure includes a plurality of reinforcing structures spaced apart from each other along the connecting portion, and a power wire is disposed between the plurality of reinforcing structures such that the plurality of reinforcing structures are configured to protect the power wire from an impact.

2. The battery unit of claim 1, wherein a front end of the longitudinal member is coupled to a rear end of a front side member.

3. The battery unit of claim 1, wherein the battery unit and a front cross member are installed under a center floor, a front end of the longitudinal member is coupled to the front cross member and a rear end of a front side member.

4. The battery unit of claim 1, wherein the battery unit and a rear cross member are installed under a center floor, a rear end of the longitudinal member is coupled to the rear cross member.

5. The battery unit of claim 1, wherein a transverse member extending in the left-right direction is coupled to the lower surface of the two battery compartments.

6. The battery unit of claim 1, wherein the power wire is electrically connected to at least one of the two battery modules and extending from a first of the two battery compartments to a second of the two battery compartments through the connecting portion.

* * * * *